United States Patent [19]

Arrighetti et al.

[11] 4,113,694
[45] Sep. 12, 1978

[54] PROCESS FOR PRODUCING STABILIZED OLEFIN TERPOLYMERS AND STABILIZED OLEFIN TERPOLYMERS PRODUCED ACCORDING TO SAID PROCESS

[75] Inventors: Sergio Arrighetti; Sebastiano Cesca; Giuseppe Ghetti; Eugenio Vajna, all of San Donato Milanese, Italy

[73] Assignee: Snam Progetti, S.p.A., San Donato Milanese, Milan, Italy

[21] Appl. No.: 775,776

[22] Filed: Mar. 9, 1977

Related U.S. Application Data

[62] Division of Ser. No. 567,299, Apr. 11, 1975, Pat. No. 4,055,535, which is a division of Ser. No. 275,936, Jul. 28, 1972, Pat. No. 3,892,712.

[30] Foreign Application Priority Data

Jul. 31, 1971 [IT] Italy .............................. 27014 A/71

[51] Int. Cl.$^2$ .............................................. C08L 9/00
[52] U.S. Cl. ........................................ 260/875; 260/66; 260/45.7 R; 526/19; 526/39; 526/40; 526/53; 526/55; 526/54; 526/283
[58] Field of Search .............. 260/66, 45.7 R; 526/19, 526/53, 54, 283

[56] References Cited

U.S. PATENT DOCUMENTS

| | | | |
|---|---|---|---|
| 3,538,193 | 11/1970 | Meredith | 260/878 R |
| 3,625,514 | 3/1972 | Cesca et al. | 260/80.78 |
| 3,657,204 | 4/1972 | Cesca et al. | 260/80.78 |
| 3,764,588 | 10/1973 | Arrighetti et al. | 260/80.7 |

*Primary Examiner*—Lucille M. Phynes

*Attorney, Agent, or Firm*—Morgan, Finnegan, Pine, Foley & Lee

[57] ABSTRACT

A method is described whereby olefin terpolymers, consisting of ethylene, an alpha olefin and a polyene having in the molecule, in addition to the double bond participating in the formation of the macromolecule, at least one conjugated double bond system, are stabilized against oxidative aging without destroying their characteristic high vulcanization rate by reacting them with a dienophilic agent represented by one of the following formulae:

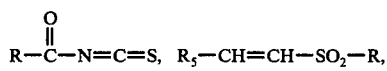

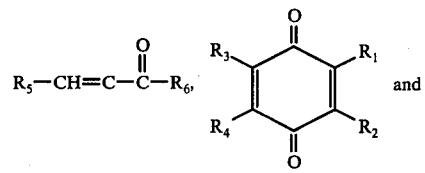

and

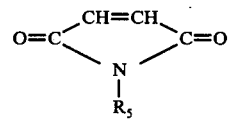

wherein R and $R_6$ may be an alkyl, alkenyl, cycloalkyl, aryl or aralkyl radical having up to 8 carbon atoms, $R_1$, $R_2$, $R_3$, $R_4$ and $R_5$ may be hydrogen or akyl, aryl, cycloalkyl or aralkyl radicals having up to 8 carbon atoms, the $R_1$-$R_2$ and R -R pairs may be divalent radicals forming condensed rings.

9 Claims, No Drawings

PROCESS FOR PRODUCING STABILIZED OLEFIN TERPOLYMERS AND STABILIZED OLEFIN TERPOLYMERS PRODUCED ACCORDING TO SAID PROCESS

This is a division, of application Ser. No. 567,299 filed Apr. 11, 1975, Pat. No. 4,055,535 which in turn is a division of Ser. No. 275,936 filed July 28, 1972, now U.S. Pat. No. 3,892,712.

The present application relates to a process for producing stabilized terpolymers and the stabilized terpolymers produced by that process.

There are disclosed in many preceding applications for patents and patents some olefin terpolymers consisting of ethylene, one alpha olefin and polyenes containing in the molecule, beside a double bond which enters in the macromolecule formation, also at least a conjugated double bond system which is disposable for the subsequent vulcanization.

It is also known that said terpolymers present a very high vulcanization rate, comparable with those of the diolefin polymers such as natural rubber, polybutadiene, polyisoprene and the like.

This property can be advantageously utilized for the covulcanization of said terpolymers when admixed with the above diene polymers or copolymers. However it is to be noted that some of these terpolymers present, when unvulcanized, a tendency to ageing caused by the presence of the very reactive conjugated double bond systems.

We have found that the above terpolymers can be stabilized against oxidative ageing without losing their characteristic high vulcanization rate.

The first object of the invention is a process for stabilizing terpolymers by reacting them with dienophilic agents.

A second object of the present invention is to provide stabilized terpolymers obtained from that process.

Another object of the present invention is to provide vulcanized terpolymers obtained from those stabilized terpolymers.

The employed olefin terpolymer includes along the polymer chain one of the following groups:

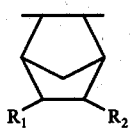 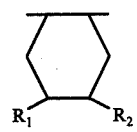

wherein $R_1$ and $R_2$ are substituents different each other, one of them being always hydrogen the other being an alkadienyl radical of the kind

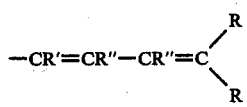

and

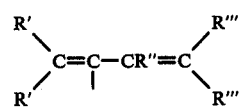

or an alkenyl radical as:

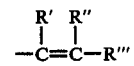

wherein the double bond is conjugated with a double bond present in the ring, R being always an alkyl radical and R′, R″ and R‴ can be hydrogen or alkyl and aryl radical; moreover the radical may present the general formula:

$$-(CH_2)_n-B$$

n being comprised between 0 and 5, B being a cyclodienic radical selected among

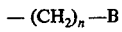

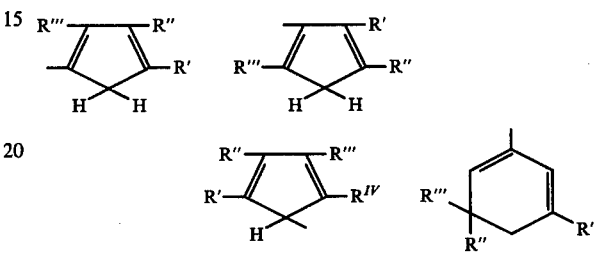

wherein R′, R″, R‴ and R$^{IV}$ have the abovementioned meanings. Furthermore the employed olefin polymers are the ones containing in the polymeric chain one of the following groups

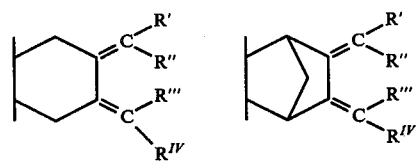

wherein R′, R″, R‴ and R$^{IV}$ can be hydrogen, alkyl or aryl radicals, alone or by pair can be divalent radicals able to form a condensed ring.

Illustrative examples of olefin polymers advantageously employable according to the invention are the terpolymers disclosed and claimed by the applicant in the Italian patent 843.706 and 851.691 corresponding to U.S. Pat. Nos. 3,652,514 and 3,657,204, respectively, and in the Italian applications for patent n 19653/A/70 and 19657 A/70 corresponding to U.S. Pat. No. 3,764,588 and U.S. application Ser. No. 108,974, now abandoned, respectively, and others based on the following termonomers:

| | |
|---|---|
| | (2-norbon-5 enyl)-1′ or 2′ or 3′ methyl-1′ or 2′ or 5′ cyclopentadienyl)-methane |
| | Dehydro-iso-dicyclopentadiene |
| | 2-(2′,4′-dimethyl-penta 1′, 3′ dienyl-)-norborn 5-ene |
| | 2,3-dimethylen-norborn-5-ene |
| | 2-propenyl-norborn-2,5-diene |

The dienophilic reagents employable in the process according to the present invention are the ones which have one of the following general formulae:

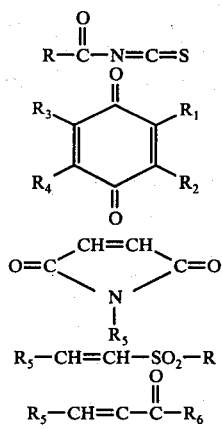

wherein R and $R_6$ can be an alkyl, alkenyl, cycloalkyl, aryl or arylalkyl radical having up to 8 carbon atoms, $R_1$, $R_2$, $R_4$, $R_5$ can be hydrogen or alkyl, aryl, cycloalkyl or arylalkyl radicals having up to 8 carbon atoms, furthermore the pairs $R_1$, and $R_2$, $R_3$ and $R_4$ may form divalent hydrocarbon radicals which give rise to condensated rings.

Illustrative examples of dienophilic agents employed in the present invention are:

acetyl, acrylaryl- and benzoyl-isothiocyanate, maleimide, methyl-vinyl-ketone, ethyl vinyl ketone, methyl vinyl sulphone and the like. Said dienophilic agents react very easily with terpolymers under mild conditions at a temperature comprised between 0° and 150° C preferably between 15° and 90° C; advantageously but not restrictively the reaction takes place in hydrocarbon solutions of the olefin polymer the concentration of the latter being comprised between 0.1 and 20%.

The reaction time depends on the reactivity of the dienophilic agent and on the employed temperature, however it may be from some minutes to 50 hours.

Said stabilized terpolymers can be employed in the field of the synthetic rubbers, either for particular purposes or admixed with other synthetic rubbers with which it can be vulcanized.

The following illustrative examples illustrate the invention:

EXAMPLE 1

150g of a terpolymer containing ethylene (60% by weight) propylene (39.5% by weight) and methyl-cyclopentadienyl norbornenyl methane (0.5% by weight), prepared according to the Italian patent 851,691 and having $[\eta] = 2.1$ dl/g in toluene at 30° C, were dissolved into 5 liters of toluene whereto 3g of methyl-vinyl ketone were added. The solution was stirred at room temperature for 8 hours, whereafter the polymer was coagulated with an excess of methanol, dissolved in n-hexane, coagulated again with methanol, dried under vacuum at 50° C. The polymer was still soluble and its intrinsic viscosity in toluene at 30° C was 2.2 dl/g.

On the obtained product tests of resistance to thermal ageing have been carried out in an oven provided with a forced circulation of air, at 100° C, and tests of vulcanization have been carried out at 145° C. On table 1 data are reported concerning the ageing tests, carried out on the original polymers and on the modified polymer according to present example.

On table 2 the variations of Mooney viscosity have been reported depending on the ageing times compared with the ones of the original polymer which have been assumed to be 100.

With the polymer subjected to the treatment indicated in the present example a mix has been prepared according to the following recipe: polymer 100, HAF 50, ZnO 5, cyclohexyl benzothiazyl sulphenamide 1, sulphur 1.7 which has been cured at 145° C for 60 minutes. The tensile stress tests on vulcanized specimens gave the results reported on table 2.

The treatment carried out on the terpolymer gave therefore a substantial improvement of the ageing resistance thereof allowing on the other side its effective vulcanization.

EXAMPLE 2-10

Terpolymers containing ethylene, propylene and the termonomer indicated in table 1 were dissolved in toluene, reacted with various compounds having dienophilic character indicated on table 1 and purified according to the procedures of example 1.

The ageing and vulcanization tests were carried out as in example 1, the results are reported on table 2. In all cases an improvement was observed as to the ageing resistance in comparison with non modified polymers owing to the reaction with dienophilic agent together with a good vulcanization of modified polymers.

TABLE 1

| Ex. | (M) tol. 30° C | Ethylene (% by weight) | Propylene (% by weight) | Termonomer (% by weight) | Termonomer type (1) | Dienophilic agent type (2) | Dienophilic agent Termonomer | sole (3) sole | (M) tol. 30° C (after treatment) |
|---|---|---|---|---|---|---|---|---|---|
| 1 | 2,10 | 60 | 39,5 | 0,5 | A | MVK | 10,6 | | 2,2 |
| 2 | 1,80 | 58 | 39,9 | 2,1 | A | NQ | 12 | | 1,9 |
| 3 | 1,60 | 55 | 42,2 | 2,5 | A | TBQ | 3 | | 1,7 |
| 4 | 1,5 | 60 | 48,2 | 1,8 | A | MA | 5 | | 1,6 |
| 5 | 1,75 | 61 | 47,1 | 1,9 | A | MVS | 5,5 | | 1,4 |
| 6 | 2,00 | 56 | 42,2 | 1,8 | B | MA | 2,2 | | 1,8 |
| 7 | 1,65 | 54 | 43,5 | 2,5 | C | MBQ | 5 | | 1,9 |
| 8 | 1,70 | 57 | 40,7 | 2,3 | C | ASC | 10 | | 1,8 |
| 9 | 1,90 | 58 | 38,5 | 3,5 | D | MVK | 11,2 | | 2,1 |

TABLE 1-continued

| Ex. | (M) tol. 30° C | Ethylene (% by weight) | Propylene (% by weight) | Termonomer (% by weight) | Termonomer type (1) | Dienophilic agent type (2) | Dienophilic agent Termonomer | sole (3) sole | (M) tol. 30° C (after treatment) |
|---|---|---|---|---|---|---|---|---|---|
| 10 | 2,20 | 55 | 42,2 | 2,8 | E | NQ | | 3,5 | 2,35 |

(1) A - (2 norbor-5 enyl) (1' or 2' or 3' methyl - 1' or 4' or 5' cyclopentadienyl) methane
    B - (2-norbor-5-enyl) (1' or 2' or 3' cyclopentadienyl) methane
    C - dehydro-isodicyclopentadiene
    D - 2(2', 4' dimethylpenta -1', 3' dienyl) norbor-5 ene
    E - (2-norbor-5 enyl) (3', 5', 5' trimethyl cyclohexa-1', 3' dienyl) methane
(2) NQ - napthoquione
    TBQ - tert - butyl quinone
    MA - maleanil
    MVS - methylvinyl sulphone
    MBQ - methyl benzoquinone
    ASC - acroylsulphocyanide
    MVK - methyl-vinyl-ketone
(3) reacted at room temperature

TABLE 2

| Example | Mooney modified polymer / Mooney original polymer · 100 | | | $M_{200\%}$ 2 (Kg/cm²) | Tensile strength (Kg/cm²) | Elongation at break (%) | Tension set (%) |
|---|---|---|---|---|---|---|---|
| | 26 hours | 42 hours | 300 hours | | | | |
| 1 | 15 | 21 | 45 | 24 | 163 | 665 | 50 |
| 2 | 1 | 1 | 7 | 60 | 234 | 490 | 17 |
| 3 | 8 | 26 | — | 79 | 245 | 445 | 8 |
| 4 | 7 | 9 | 64 | 18 | 110 | 790 | 60 |
| 5 | 28 | 36 | 43 | 21 | 129 | 705 | 50 |
| 6 | 20 | 23 | 40 | 50 | 200 | 440 | 50 |
| 7 | 15 | 20 | 35 | 60 | 240 | 450 | 50 |
| 8 | 18 | 26 | 50 | 45 | 250 | 420 | 15 |
| 9 | 25 | 30 | 40 | 60 | 220 | 420 | 10 |
| 10 | 1 | 1 | 2 | 60 | 240 | 440 | 15 |

What we claim is:

1. A process for preparing an olefin terpolymer which is stabilized against oxidative aging, which comprises reacting in a hydrocarbon solvent and at a temperature between 0° and 150° C:
   (a) a terpolymer of ethylene, another alpha olefin, and a polyene selected from the group consisting of dehydro-iso-dicyclopentadiene and 2-(2',4'-dimethyl-penta 1',3'-dienyl-)-norborn-5-ene, having in addition to a double bond for participating in the terpolymer formation, conjugated double bonds in the cyclopentadienyl substituent, with
   (b) a dienophilic agent of the general formula:

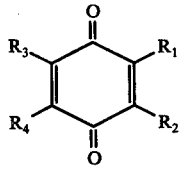

wherein $R_1$, $R_2$, $R_3$, and $R_4$ may be hydrogen or alkyl, aryl, cycloalkyl or aralkyl radicals having up to 8 carbon atoms, moreover the $R_1$-$R_2$ and $R_3$-$R_4$ pairs may be divalent radicals forming condensed rings.

2. Terpolymers stabilized against the oxidative ageing consisting of the reaction product according to the process of claim 1.

3. The process according to claim 1 wherein the hydrocarbon solvent is toluene.

4. The process according to claim 1 wherein the reaction occurs at a temperature in the range from 15°-90° C.

5. The process of claim 1 including recovering the stabilized olefin terpolymer reaction product from the hydrocarbon solvent by the steps comprising
   (i) contacting the product and solvent mixture with an excess of methanol to coagulate the polymer and separate the polymer;
   (ii) redissolving the polymer in a solvent therefor;
   (iii) contacting the product and a solvent mixture again in an excess of methanol to coagulate the polymer and separate the polymer; and
   (iv) drying the polymer.

6. The process of claim 1 wherein the dienophilic agent is selected from the group consisting of naphthoquinone, methyl benzoquinone, and tertiary-butyl quinone.

7. The process of claim 1 wherein the polyene is 2-(2',4'-dimethyl-penta 1',3'dienyl-)-norborn-5-ene.

8. The process of claim 1 wherein the polyene is dehydro-iso-dicyclopentadiene.

9. The process of claim 8 wherein said dienophilic agent is methyl benzoquinone.